United States Patent
Kapur et al.

(10) Patent No.: US 7,428,533 B2
(45) Date of Patent: Sep. 23, 2008

(54) AUTOMATIC GENERATION OF TAXONOMIES FOR CATEGORIZING QUERIES AND SEARCH QUERY PROCESSING USING TAXONOMIES

(75) Inventors: Shyam Kapur, Sunnyvale, CA (US); Jignashu Parikh, Gujarat (IN); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 291 days.

(21) Appl. No.: 11/006,463

(22) Filed: Dec. 6, 2004

(65) Prior Publication Data
US 2006/0122994 A1    Jun. 8, 2006

(51) Int. Cl.
G06F 7/00    (2006.01)
G06F 17/00    (2006.01)
(52) U.S. Cl. ............................................. 707/4; 707/5
(58) Field of Classification Search ................. 707/101, 707/3–7; 715/531; 706/47
See application file for complete search history.

(56) References Cited

U.S. PATENT DOCUMENTS

| | | | |
|---|---|---|---|
| 6,363,378 B1 * | 3/2002 | Conklin et al. | 707/5 |
| 6,424,973 B1 | 7/2002 | Baclawski | |
| 6,446,061 B1 | 9/2002 | Doerre et al. | 707/3 |
| 6,460,034 B1 | 10/2002 | Wical | |
| 6,513,027 B1 * | 1/2003 | Powers et al. | 706/47 |
| 6,631,372 B1 | 10/2003 | Graham | |
| 6,853,982 B2 | 2/2005 | Smith et al. | |
| 6,922,691 B2 | 7/2005 | Flank | |
| 7,181,438 B1 * | 2/2007 | Szabo | 707/2 |
| 2002/0188586 A1 | 12/2002 | Veale | |
| 2003/0014399 A1 | 1/2003 | Hansen et al. | |
| 2003/0115191 A1 * | 6/2003 | Copperman et al. | 707/3 |
| 2003/0126561 A1 * | 7/2003 | Woehler et al. | 715/531 |
| 2003/0217052 A1 * | 11/2003 | Rubenczyk et al. | 707/3 |
| 2004/0111408 A1 | 6/2004 | Caudill et al. | |
| 2004/0139058 A1 | 7/2004 | Gosby et al. | 707/3 |
| 2004/0260677 A1 | 12/2004 | Malpani et al. | |
| 2005/0234879 A1 * | 10/2005 | Zeng et al. | 707/3 |
| 2005/0234953 A1 * | 10/2005 | Zhang et al. | 707/101 |

FOREIGN PATENT DOCUMENTS

WO    WO 02/019147 A1    3/2002

OTHER PUBLICATIONS

"Notification of Transmittal of the International Search Report and the Written Opinion of the International Searching Authority, or the Declaration" received in International application No. PCT/US04/37571.

"Notification of Transmittal of the International Search Report and the Written Opinion of the International Searching Authority, or the Declaration" received in corresponding International application No. PCT/US2005/043111.

(Continued)

*Primary Examiner*—Hung T Vy
(74) *Attorney, Agent, or Firm*—Hickman Palermo Truong & Becker LLP; Christian A. Nicholes

(57) ABSTRACT

Systems and methods for processing search requests are provided, including automatic generation of taxonomies and query processing using those taxonomies.

12 Claims, 10 Drawing Sheets

OTHER PUBLICATIONS

Claims, International application No. PCT/US2005/043111, 1 page.
The International Bureau of WIPO, "Notification Concerning Transmittal of International Preliminary Report on Patentability (Chapter 1 of the Patent Cooperation Treaty", International application No. PCT/US2005/043111, dated Jun. 21, 2007, 6 pages.

* cited by examiner

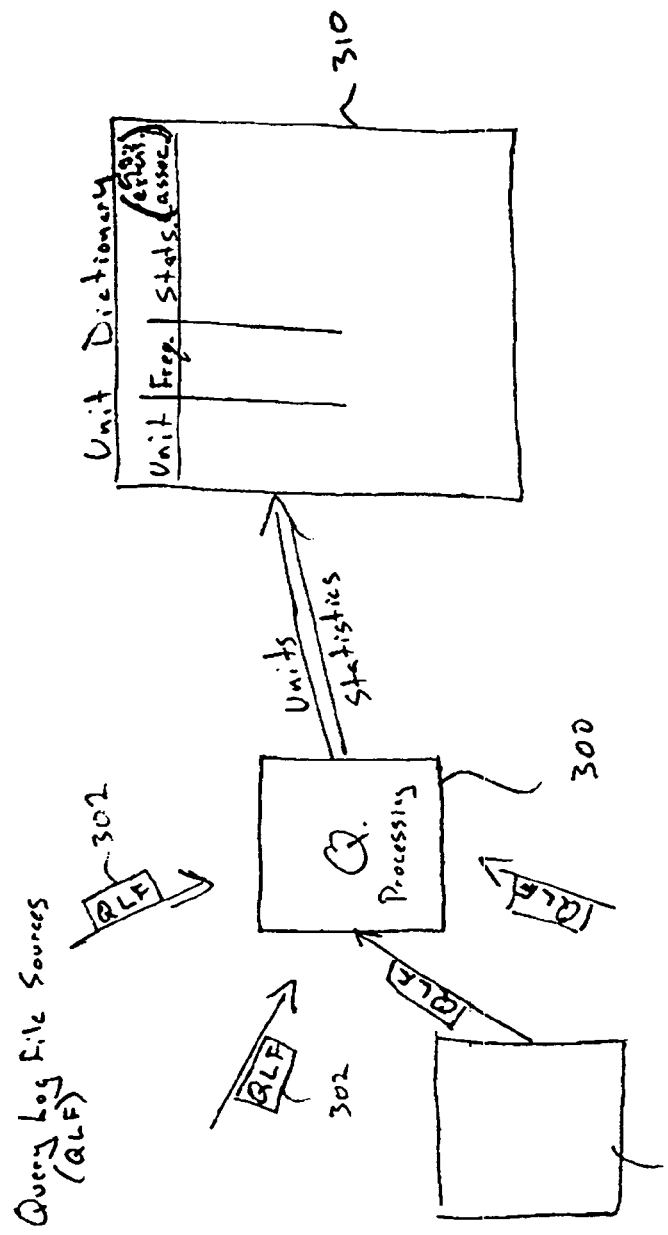
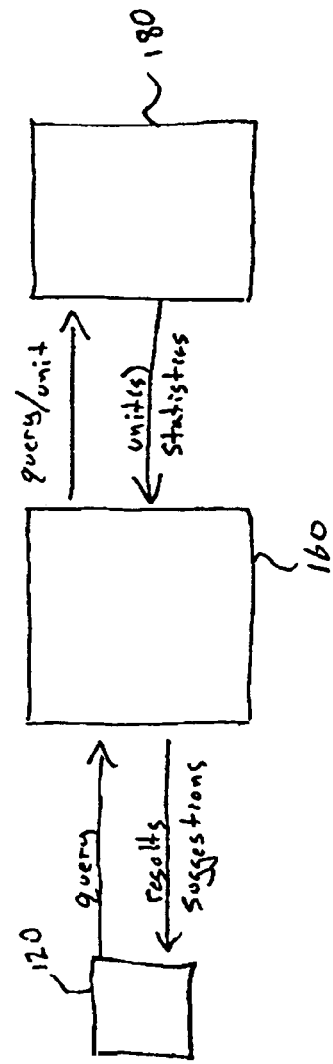
Figure 3
Figure 4

$$\begin{array}{c} \\ \text{Existing} \\ \text{Taxonomies} \\ \\ \\ \text{Generated} \\ \text{Taxonomies} \end{array} \begin{array}{c} \\ \left[\begin{array}{c} \tau_1 \\ \tau_2 \\ \tau_3 \\ \vdots \\ \end{array}\right. \\ \\ \left[\begin{array}{c} \tau_{14} \\ \tau_{15} \\ \tau_{16} \\ \vdots \end{array}\right. \end{array} \begin{array}{cccccc} q_1 & q_2 & q_3 & q_4 & \ldots & q_{20,000,000} \ldots \\ \hline c_{11} & c_{12} & c_{13} & c_{14} & \ldots & c_{1,\,25{,}000{,}000} \\ c_{21} & c_{22} & c_{23} & c_{24} & \ldots & \\ c_{31} & c_{32} & c_{33} & c_{34} & \ldots & \\ \vdots & \vdots & \vdots & \vdots & & \\ ? & ? & ? & ? & \ldots & \\ ? & ? & ? & ? & \ldots & \\ ? & ? & ? & ? & \ldots & \\ \vdots & \vdots & \vdots & \vdots & & \end{array}$$

FIG. 11

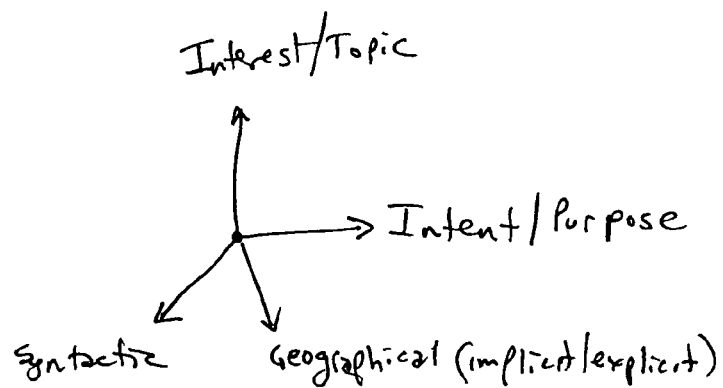

FIG. 12

AUTOMATIC GENERATION OF TAXONOMIES FOR CATEGORIZING QUERIES AND SEARCH QUERY PROCESSING USING TAXONOMIES

CROSS-REFERENCES TO RELATED APPLICATIONS

The present disclosure is related to the following commonly assigned applications/patents:

U.S. patent application Ser. No. 10/712,307, filed Nov. 12, 2003, entitled "Systems and Methods for Search Query Processing Using Trend Analysis" to Kapur (hereinafter "Kapur I")

U.S. patent application Ser. No. 10/713,576, filed Nov. 12, 2003, entitled "Systems and Methods for Generating Concept Units from Search Queries" to Kapur et al. (hereinafter "Kapur II");

U.S. patent application Ser. No. 10/797,614, filed Mar. 9, 2004, entitled "Systems and Methods for Search Processing Using Superunits" to Kapur et al. (hereinafter "Kapur III");

U.S. patent application Ser. No. 10/818,752, filed Apr. 5, 2004, entitled "Universal Search Interface System and Methods" to Kapur. (hereinafter "Kapur IV"); and U.S. patent application Ser. No. 11/006,466, filed Dec. 6, 2004, entitled "Search Processing with Automatic Categorization of Queries" to Kapur (hereinafter "Kapur V").

The respective disclosures of these applications/patents are incorporated herein by reference in their entirety for all purposes.

BACKGROUND OF THE INVENTION

The present invention relates generally to network and Internet search and interface systems and more particularly to search systems that provide enhanced search functionality including functions wherein search queries are automatically categorized according to one or more taxonomies and wherein taxonomies can be automatically generated from past queries and/or user actions in relation to the queries.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links (in the case of searching the web), documents and/or references (in the case of a different search corpus) related to the query. The links returned may be closely related, or they may be completely unrelated, to what the user was actually looking for. The "relatedness" of results to the query may be in part a function of the actual query entered as well as the robustness of the search system (underlying collection system) used. Relatedness might be subjectively determined by a user or objectively determined by what a user might have been looking for.

Taxonomies take time to update manually, but since they can be useful for searching large corpuses, automated methods of generating taxonomies for large corpuses would be useful.

BRIEF SUMMARY OF THE INVENTION

Embodiments of the present invention provide systems and methods for processing search requests, including analyzing received queries in order to provide a more sophisticated understanding of the information being sought.

In some embodiments, categorization is done using a learned set of query-node pairs where a pair maps a particular query to a particular node in the taxonomy. The learned set might be initialized from a manual indication of which queries go with which nodes and enhanced as more searches are performed. One method of enhancement involves tracking post-query click activity to identify how a category estimate of a query might have varied from an actual category for the query as evidenced by the category of the post-query click activity, e.g., a particular hits of the search results that the user selected following the query. A manually created taxonomy might drive the search process, but a taxonomy can be manually generated from a history or queries and/or other taxonomies.

The following detailed description together with the accompanying drawings will provide a better understanding of the nature and advantages of the present invention.

BRIEF DESCRIPTION OF THE DRAWINGS

FIG. 3 is a graphical representation of a concept network according to an embodiment of the present invention.

FIG. 4 is a simplified block diagram of a query processing engine according to an embodiment of the present invention.

FIG. 11 is an illustration of a matrix used to identify mappings between nodes of taxonomies.

FIG. 12 is an illustration of various dimensions among which taxonomies might range.

DETAILED DESCRIPTION OF THE INVENTION

I. Overview

A. Network Implementation

Figure 1:
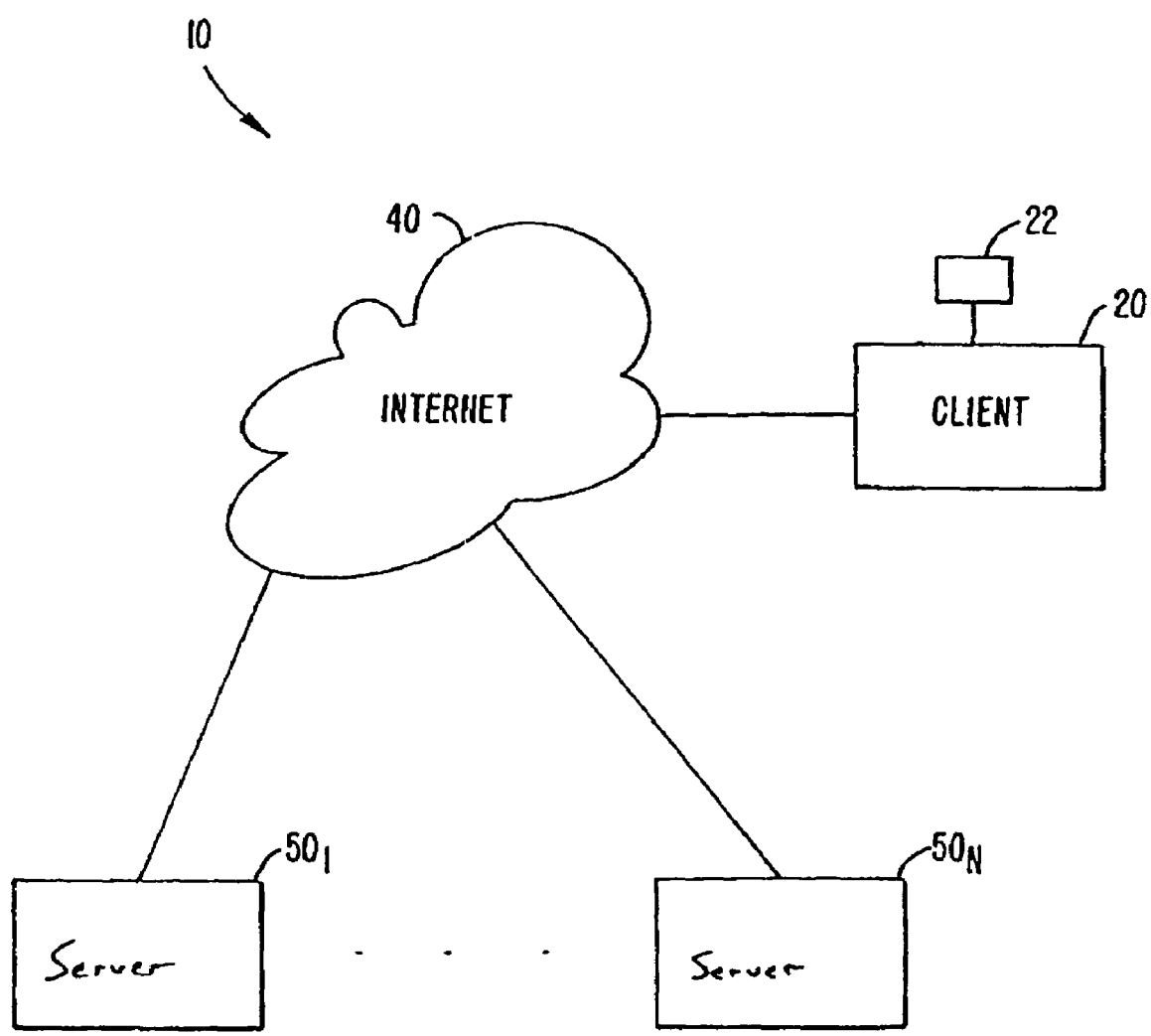
FIG. 1 is a simplified high-level block diagram of an information retrieval and communication system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems 501 to 50N, e.g., to access, receive, retrieve and display media content and other information such as web pages.

Client system 20 also typically includes one or more user interface devices 22. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like. Additional details of an embodiment of a client system are described in Kapur V.

B. Search System

Figure 2:
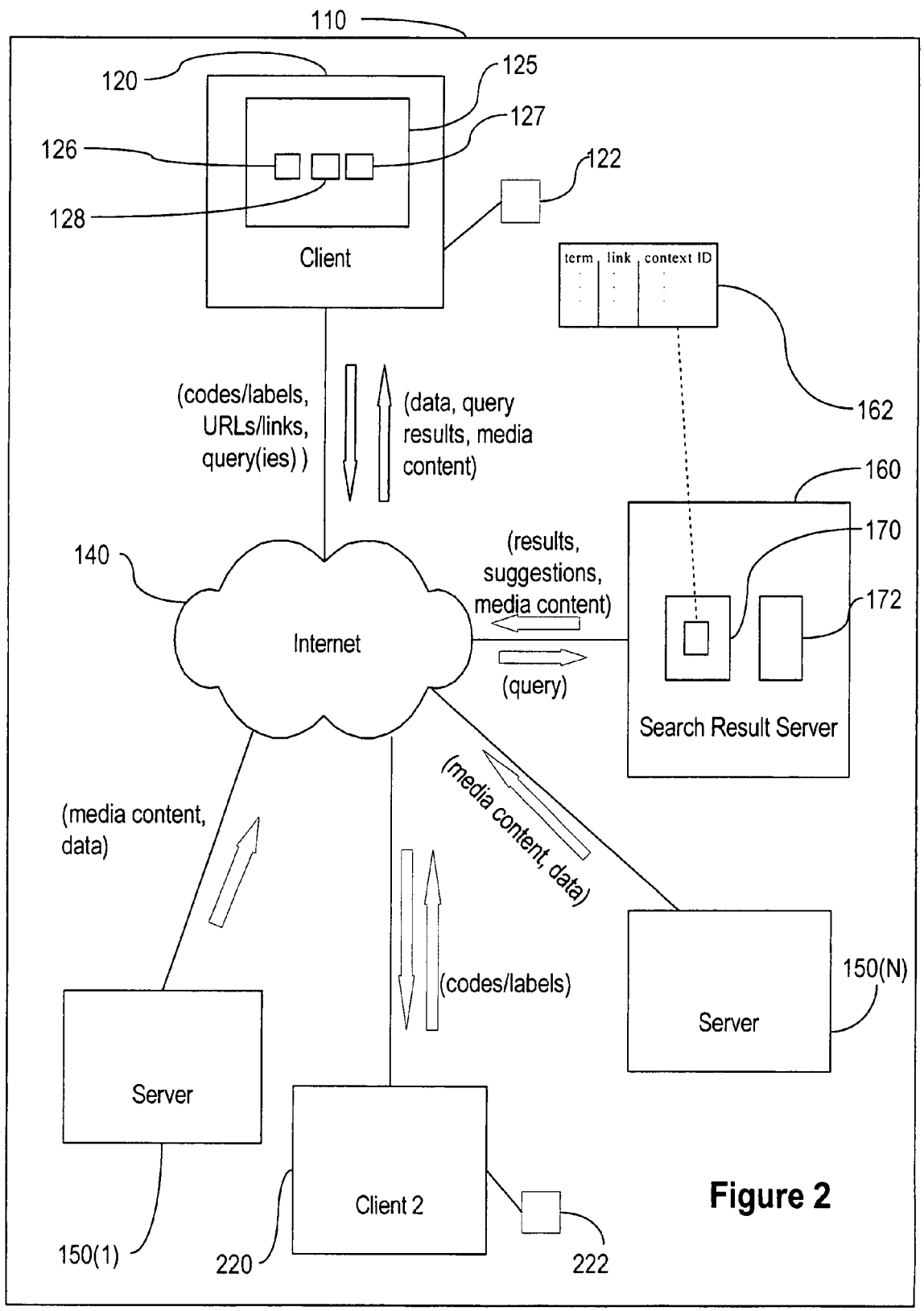
FIG. 2 is a simplified block diagram of an information retrieval and communication network for communicating media content according to an embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. In some embodiments, client application module 125 provides features of a universal search interface as described in Kapur IV. Other details are described in Kapur V.

According to one embodiment, server system 160 is configured to provide search result data and media content to client system 120, and server system 150 is configured to provide data and media content such as web pages to client system 120, for example, in response to links selected in search result pages provided by server system 160. As will be described in more detail below, server system 160 in one embodiment references various collection technologies for populating one or more indexes with, for example pages, links to pages, etc. Such collection technologies include automatic web crawlers, spiders, etc., as well as manual or semi-automatic classification algorithms and interfaces for classifying and ranking web pages within a hierarchical structure such as a taxonomy. In certain aspects, server 160 is also configured with search related algorithms for processing and ranking web pages. Server 160 is also preferably configured to record user query activity in the form of query log files, such as the queries submitted, when they were submitted, who submitted them and what the submitter did after receiving search results.

Search server system 160 in one embodiment references various page indexes 170 that are populated with, e.g., pages, links to pages, data representing the content of indexed pages, etc. Page indexes may be generated by various collection technologies including automatic web crawlers, spiders, etc., as well as manual or semi-automatic classification algorithms and interfaces for classifying and ranking web pages within a hierarchical structure. These technologies may be implemented on search server system 160 or in a separate system (not shown) that generates a page index 170 and makes it available to search server system 160.

An entry 162 in page index 170 includes a search term, a link (or other encoded identifier) to a page in which that term appears and a context identifier for the page. Additional details of the operation of search server system to obtain search results is provided in Kapur IV.

As used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

In preferred aspects of the present invention, a query processing engine is provided to process queries and decompose queries into constituent units. The query processing engine allows for the system to implement concept discovery and analysis processes as well as context analysis, disambiguation and many other processes that would enhance the quality of results returned to a user in response to a search query. Examples are shown in Kapur V.

C. Concept Networks

In some embodiments, the concepts within a query are advantageously detected by reference to a unit dictionary 172 that contains a list of known concepts (or "units"). Unit dictionary 172 is advantageously generated by a concept discovery process based on some number (preferably a large number, e.g., at least several hundred thousand) of previous queries. Concept discovery involves analysis of the queries to generate a concept network and may be performed by search server 160 or by another server (not shown).

FIG. 3 illustrates a system including a query processing engine. A shown engine 300 receives query log files (or actual queries) from various sources over the Internet or through various network connections, e.g., LAN, WAN, direct links, distribution media (e.g., CD, DVD, floppy), etc. The query log files (query logs) are processed by query engine 300 using statistical methods such as may be used in information theory or concepts such as mutual information. In preferred aspects, daily query logs are used, although logs for different time periods, e.g., hours, weeks, etc. may be used as desired. Query logs typically include actual queries submitted by users, and in some cases additional useful information such as geographic location of querying users, timestamps, IP addresses of client systems, cookies, type of client (e.g., browser type), etc. Query processing engine 300 processes the various query logs and generates units therefrom. The units, and associated statistics such as frequency of occurrence are stored to a memory or database file 310.

Examples of aspects of a query processing engine including methodologies for processing queries and query logs to generate units, and for generating suggestions based on units, is described in Kapur II. Server 160 processes the units and any statistics received from system 180 and returns results responsive to the user's query to the user along with suggestions and other information. In certain aspects, suggestions are a way to involve users in a continuous dialogue with the search system. Suggestions are hints and tips about what the user might want to explore next based on highly sophisticated understanding of user needs as captured in units and their extensions and associations.

In one aspect, the unit dictionary 310 is advantageously used to generate suggestions to present to the user in addition to, or in lieu of, actual search results. For example, search server 160 or other search intelligence may send a query to a specialized server, e.g., server 180 of FIG. 4, controlling the unit dictionary, or an instance of the unit dictionary may be stored to search server 160. An example of a methodology for generating suggestions according to one embodiment, for example using extensions and associations defined in the above pseudo-code for generating units, can be found in Kapur II.

Figure 5:
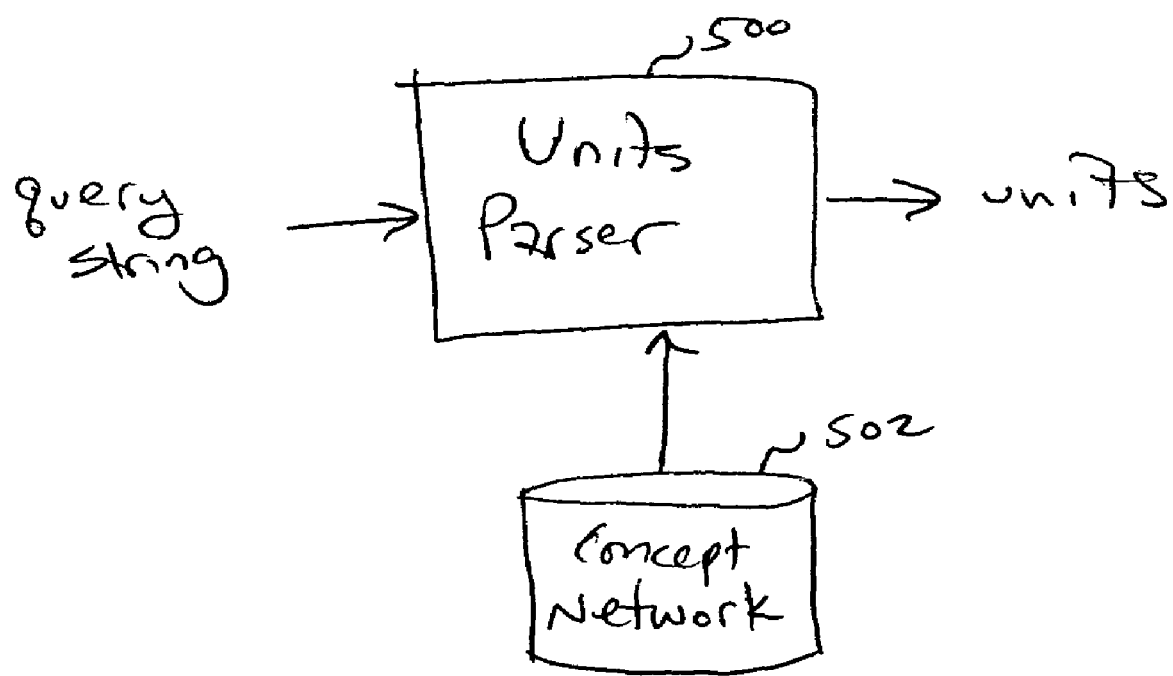
FIG. 5 is a simplified block diagram of a units generator.

FIG. 5 is a simplified block diagram of a units generator. As illustrated there, a units parser 500 accepts as input a query string (or a query record comprising the query string and other data or metadata appurtenant to the query), consults a concept network 502 and outputs one or more units representing concepts at which the query string is directed. Further details of the operation of a units generator is described in Kapur II. The units can be used for forming searches, generating suggestions for related searches, logging, and various other purposes.

Figure 6:
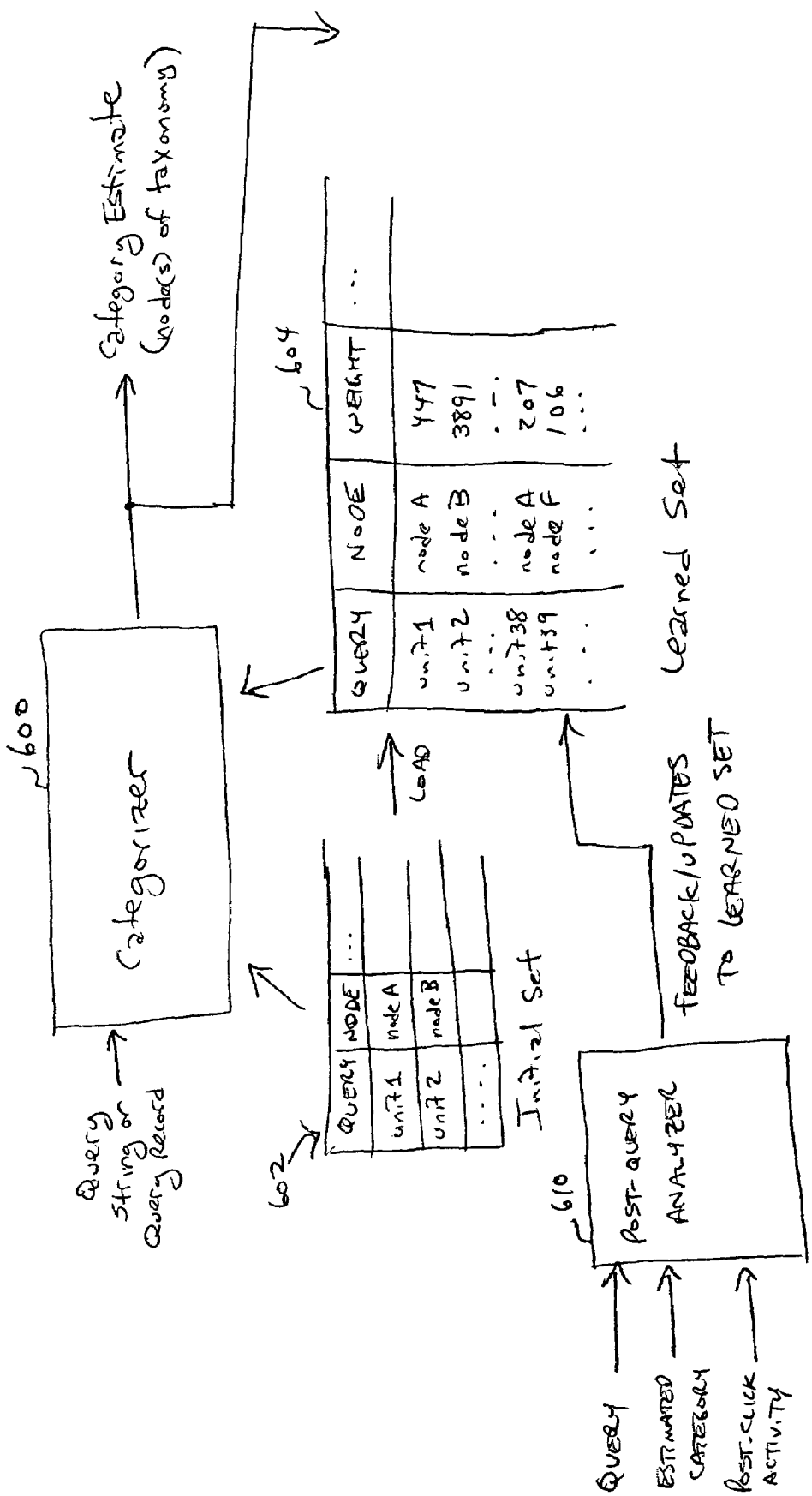
FIG. 6 is a block diagram of an embodiment of an automatic query categorizer.

FIG. 6 is a block diagram of an embodiment of an automatic query categorizer that might use the units determined by the units generator or queries to determine one or more nodes in a taxonomy 610 to which the query is to be associated. As illustrated there, a categorizer 600 receives as input one or more units and/or a query, possibly a query record, and categorizes the query onto one or more nodes of taxonomy 610. Implementations of categorizers are described in Kapur V.

Once a query's categorization to one or more nodes in a taxonomy is known, that information can be used for altering the search process.

Figure 7:
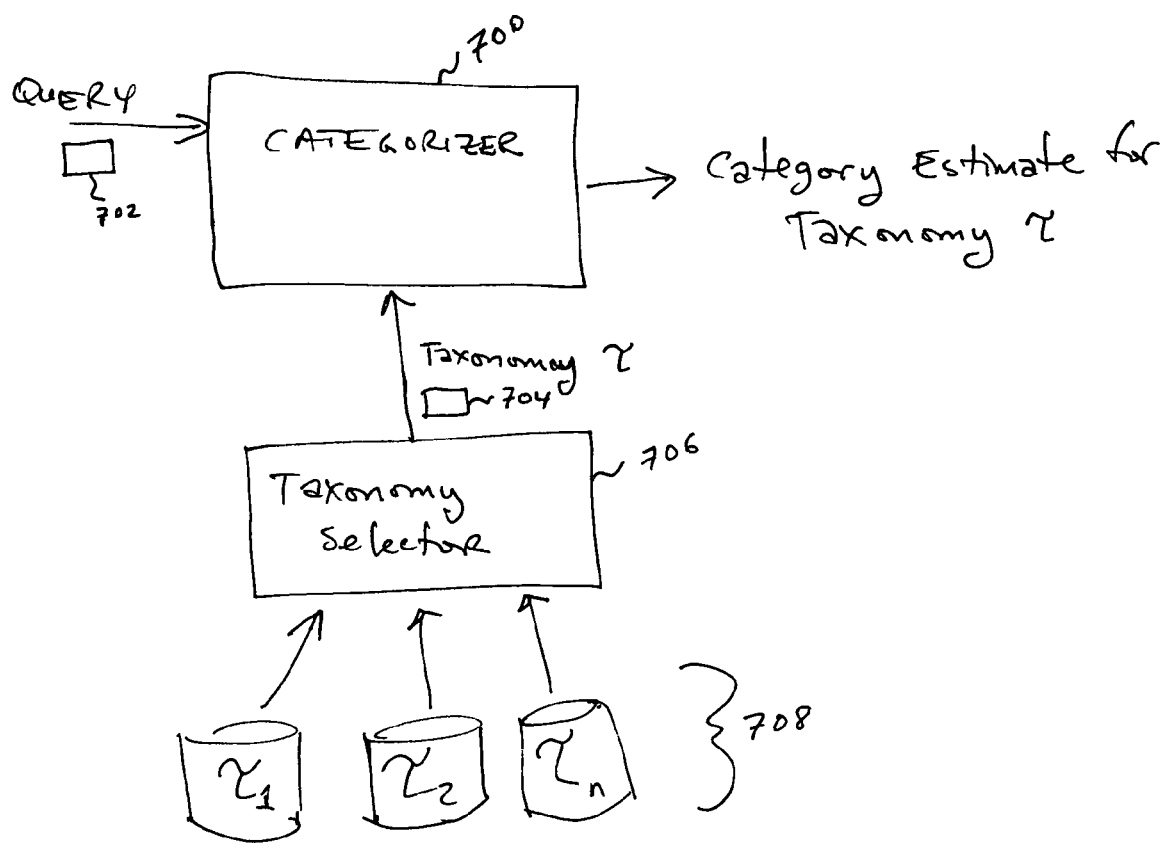
FIG. 7 is a block diagram illustrating the use of a plurality of taxonomies for categorizing a query.

FIG. 7 is a block diagram illustrating the use of a plurality of taxonomies for categorizing a query. As shown there, categorizer 700 receives a query such as a query record 702 and a taxonomy, $\tau$, such as might be provided in a taxonomy record 704. In some embodiments, taxonomy record 704 comprises an entire data structure representing a taxonomy, but in other embodiments taxonomy record 704 could be a pointer to a data structure containing the taxonomy or a node of the taxonomy. In yet other embodiments, taxonomy record 704 is some combination thereof. A taxonomy selector 706 selects the appropriate taxonomy from among a plurality 708 of taxonomies. From the selected taxonomy and the query, categorizer 700 determines a category as the minutes for the query in taxonomy $\tau$. The particular taxonomy selected might be selected using techniques described below.

Figure 8:
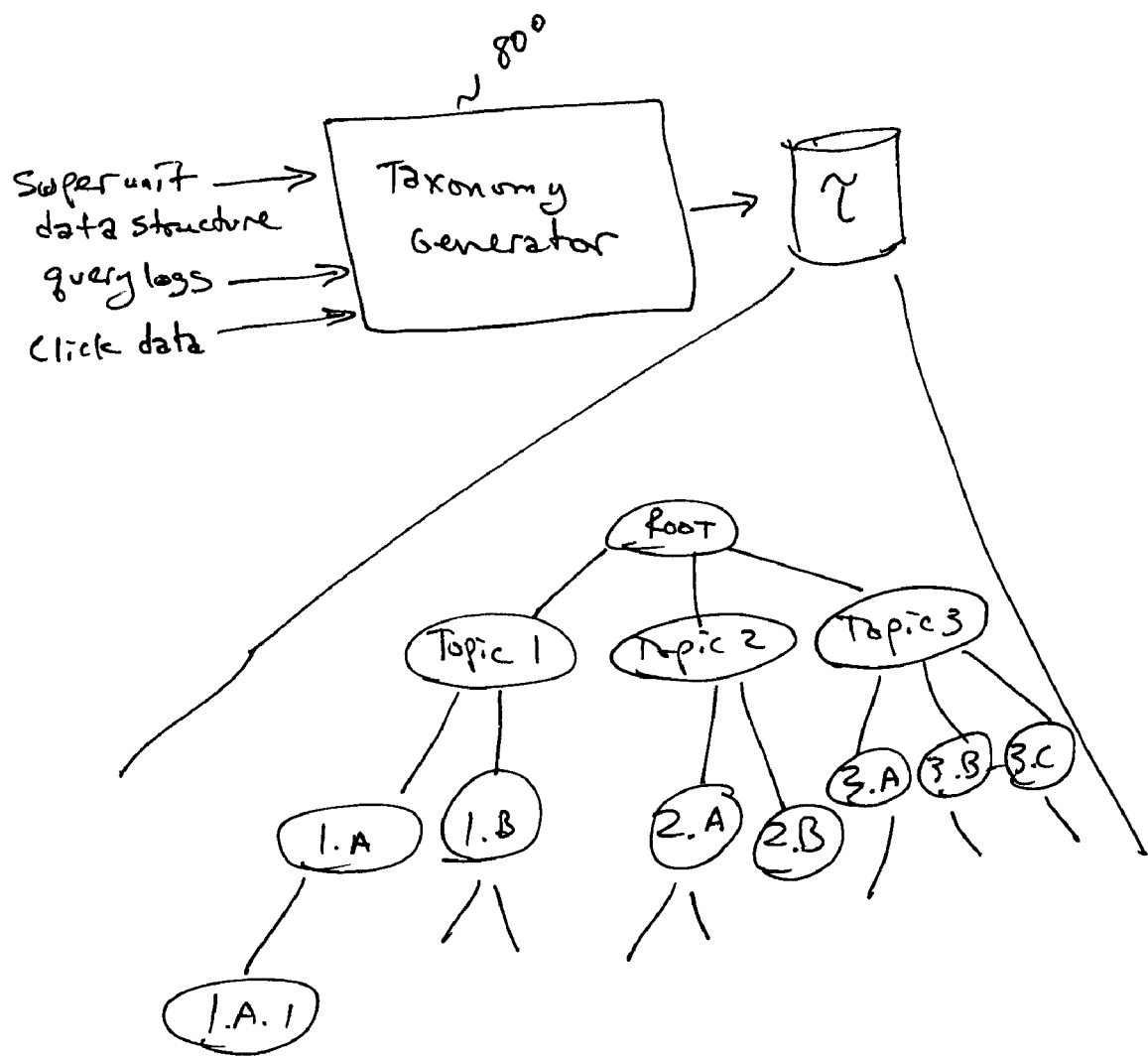
FIG. 8 is an illustration of how a taxonomy generator might generate a taxonomy.

FIG. 8 is an illustration of how a taxonomy generator might generate a taxonomy to be one of the plurality of taxonomies. As shown there, a taxonomy generator 800 might receive as its input a "super units" data structure such as those described in Kapur III, one or more query logs and/or click data, such as indications of which hyperlinks a user clicked on following a search. Taxonomy generator 800 outputs a taxonomy $\tau$ representing a hierarchical view of categories into which queries can be categorized. As shown by the example detail of the taxonomy, there is a root node that has three children nodes relating to categories shown as "Topic 1", "Topic 2" and "Topic 3". In a particular taxonomy, the categories might be "Business & Economy", "Computers & Internet", "News & Media", etc. Each of the categories might have one or more subcategories representing more specific topics within parent topics. These are illustrated in FIG. 8 as 1.A, 1.B, 2.A, etc. For example, under the node "Business & Economy", category nodes for "B2B", "Finance", "Shopping", "Jobs", etc. might be found.

As other examples, a topical taxonomy might have categories such as "sports", "movies", etc., and a user intent taxonomy might have categories such as "reviewing", "buying", "looking", "researching", etc. A geographical taxonomy might categorize by jurisdiction (nation, state, city, etc.), languages, cultures, etc. A syntactical taxonomy might categorize based on whether the query is a URL, the format of the query, etc. A navigational taxonomy might be based on where the query is pointing to, such as where a single site satisfies the query.

Taxonomy generator 800 might also use query logs and/or click data to generate a taxonomy.

Figure 9:
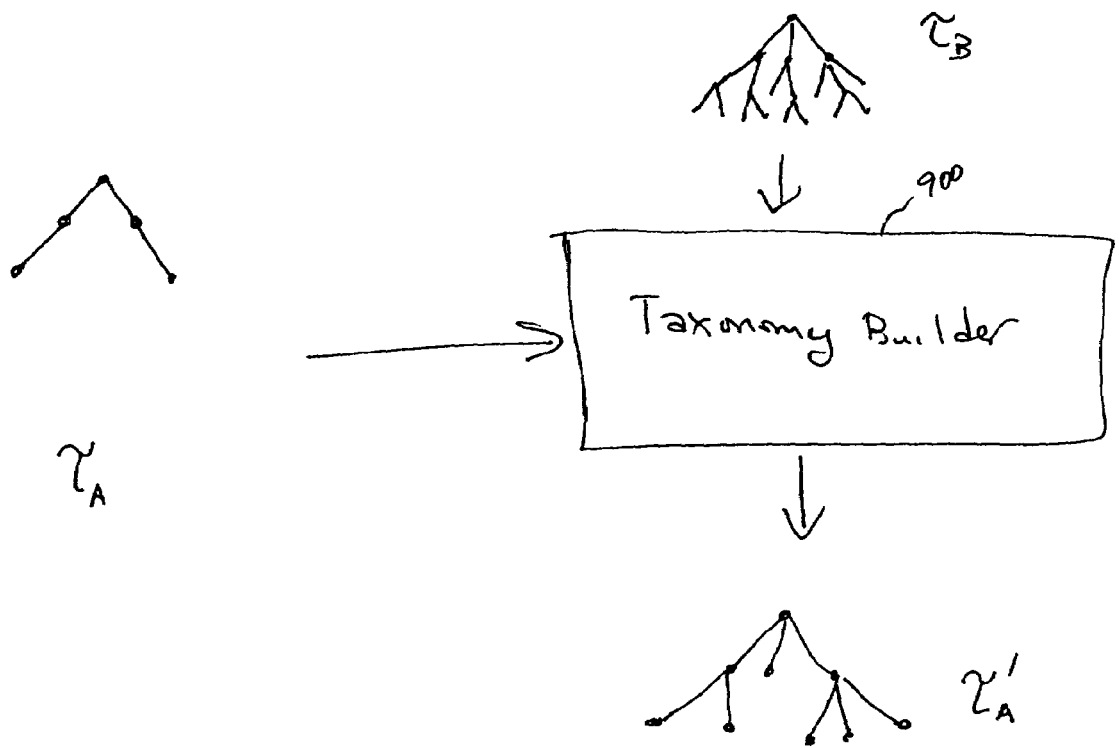
FIG. 9 is an illustration of how a taxonomy might be derived from other taxonomies.

FIG. 9 is an illustration of how a taxonomy might be derived from other taxonomies. As shown there, a taxonomy builder 900 receives an incomplete taxonomy $\tau_a$ and a helper taxonomy $\tau_b$ and "completes" the incomplete taxonomy to form a more complete taxonomy $\tau_a'$. The more complete taxonomy includes more nodes that are determined from the contents of the complete taxonomy and the helper taxonomy.

Figure 10:
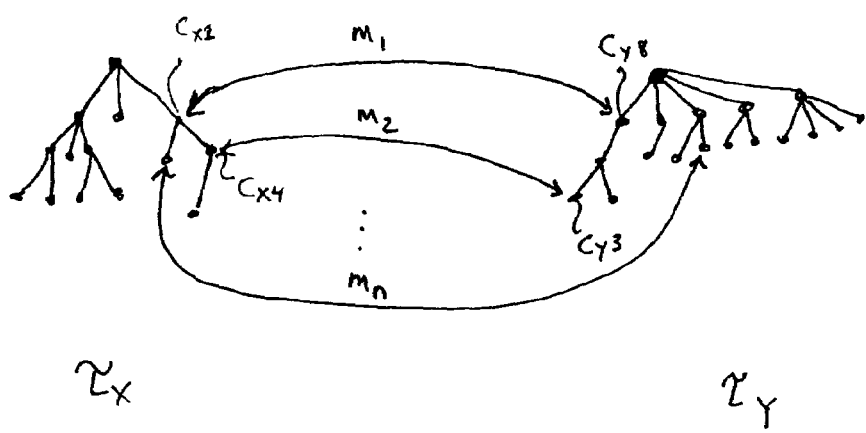
FIG. 10 is an illustration of mappings between nodes of taxonomies.

FIG. 10 is an illustration of mappings between nodes of taxonomies, as might be used by a taxonomy builder to fill in an incomplete taxonomy. As illustrated there, two taxonomies, $\tau_a$ and $\tau_b$, have nodes between them that map. For example, mapping $M_1$ maps node $C_{x1}$ of taxonomy $\tau_a$ to node $C_{y8}$ of taxonomy $\tau_b$ and mapping $M_2$ maps node $C_{x4}$ of taxonomy $\tau_a$ to node $C_{y3}$ of taxonomy $\tau_b$. Using these mappings, missing categories from one taxonomy can be determined from another taxonomy.

FIG. 11 is an illustration of a matrix used to identify mappings between nodes of taxonomies. While other techniques might be used, the technique illustrated in FIG. 11 is useful where a large query log is available. In this example, suppose 20 million or more queries are available and their categorization in one or more existing taxonomies. For each of the queries and each of the taxonomies, the matrix would maintain an indication of the category for that query/taxonomy pair. Of course, with suitable compression techniques, the matrix can be stored in small enough memory to be practical, if compression is needed.

The matrix approach might also be useful to correlate categories of different taxonomies based on the queries that are actually run. For example, query logs might show that queries categorized in node $C_i$ of taxonomy $\tau_1$ also seem to be categorized in node $C_j$ of taxonomy $\tau_2$. If $\tau_2$ is associated with a particular subdomain or property, then queries categorized in node $C_i$ might be concentrated into that subdomain or property.

In this manner, mappings can be built up semi-automatically. For example, one approach to building up mappings is to take a large number of queries, say 50 million queries ($Q_1$, $Q_2$, $Q_3$, . . . ) and for each query, categorize it in each of the available taxonomies, which could be hundreds of taxonomies. If a query cannot be categorized into a first taxonomy but can be categorized in a second taxonomy and there is a mapping from the query's category in the second taxonomy maps to a category in the first taxonomy, then the query can be categorized into that mapped node.

One method of implementing this matrix approach is to apply a query to two or more taxonomies to find node IDs for the query, then attach as a qualifier to the query some indication of the node IDs. For example, a query might be tested against a topic taxonomy and be categorized into topic=sports-soccer-professional and then tested against a geographic taxonomy and be categorized into geo=U.S.-East Coast-New York-Albany. The modified search query is then input to a search query planner that schedules the modified query. For example, a local search can be done using the node ID of the query's category in the geographic taxonomy. In some categorizations, the query is not located anywhere but is inherently local and external information is used to find the query's category in the geographic taxonomy. For example, the query "hairdresser" might be considered an inherently local query and user demographic information such as the user's zip code could be used to modify the query.

FIG. 12 is an illustration of various dimensions among which taxonomies might range. Other sets of dimensions are possible, as this is one example. In this example, some taxonomies are organized as interest/topic taxonomies, some are organized according to the user's intent or purpose, others are organized according to location, and others might be organized along syntactic lines.

For a given query, the system can determine which subdomains, verticals, properties, etc. are more relevant and focus the search there. Because improved results are possible in some cases when there are multiple taxonomies to consider, it is one advantage to having more than one taxonomy available. In most cases, with complex searches and large volumes of searches, manual generation of taxonomies is not a scalable process. As a result, automatic generation of taxonomies is useful.

In one approach of subdomain-specific searching, the concept networks are used to identify the verticals, subdomains, properties over which to search. For a taxonomy, each node has an associated concept network. For each property, there can be subproperties. Each subproperty might have a concept network for that subproperty. By comparing the concept network for the nodes of a taxonomy with the concept networks for subproperties, the more relevant subproperties can be selected for a query based on that query's node in the taxonomy.

Figure 13:
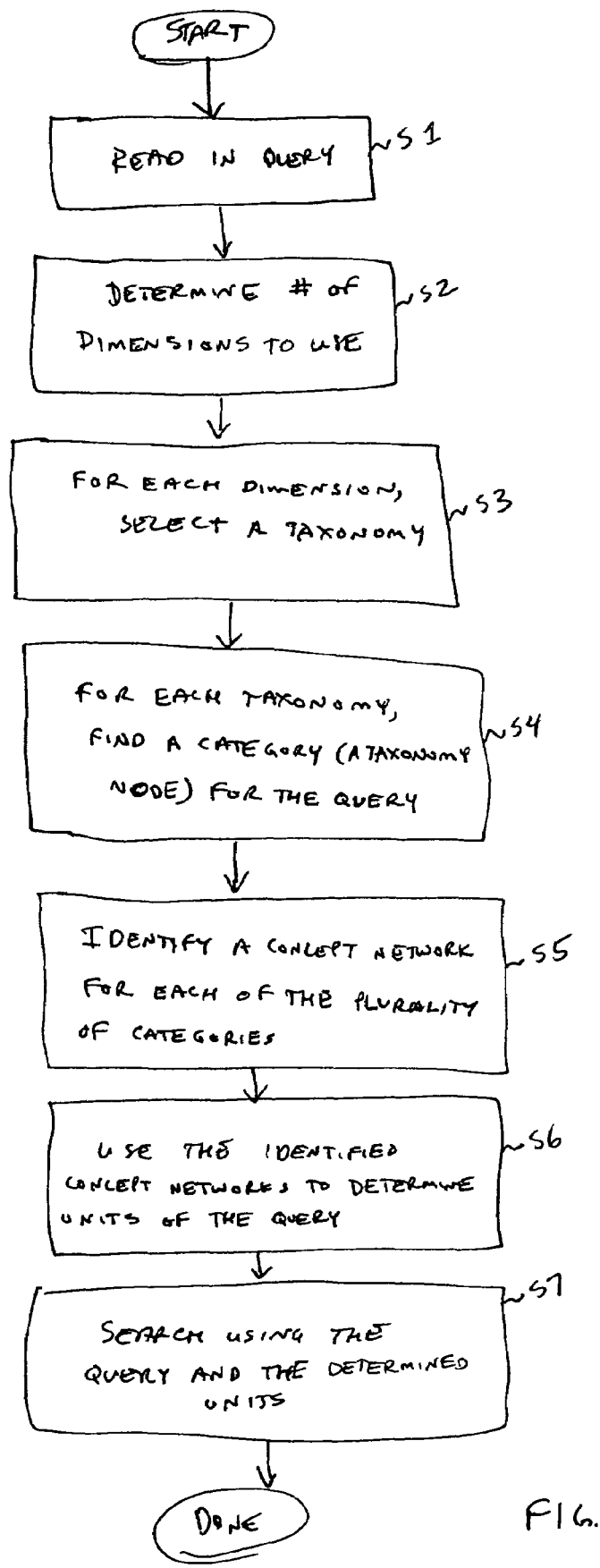
FIG. 13 is a flowchart of a process for searching using a plurality of taxonomies.

FIG. 13 is a flowchart of a process for searching using a plurality of taxonomies. As shown there, a process begins by reading in a query (step S1). Then, the number of dimensions to use is determined (S2) and for each dimension, a taxonomy is selected (S3). For each taxonomy so selected, the process finds a category (a taxonomy node) for the query (S4). For each taxonomy node found, a content network is identified (S5). Then, the identified concept networks are used to determine units of the query (S6) and the subdomains, if subdomain searching is to be done (S7).

Using more than one taxonomy dimension, if one node is found for those dimensions, then searching can be repeated over for the other dimensions or not. Thus, in a system with four dimensions, such as topic, intent, location, syntactic, a search can be done over less than four dimensions.

One approach to automatically generating taxonomies is through the use of concept networks. A concept network can be represented as a weighted graph, with units comprising concepts and their associated terms being the nodes of the graph and the edges of the graph between nodes representing the closeness of one unit to another. A taxonomy can be generated from such a graph as explained herein.

A given unit can be assigned to a leaf node (or a part of a leaf node) of the taxonomy and branches up the taxonomy can have assigned to them similar units related to the given unit. Higher up in the taxonomy, the relationship to the leaf node decreases, representing broader categories. In one approach, the technique of generating cliques is used to generate taxonomies. Examples of specific apparatus and techniques for generating clusters, cliques, and superunits from a concept network may be found in Kapur III.

In one embodiment, a taxonomy generator finds the cliques corresponding to the given unit and merges them. If no cliques are available, the taxonomy generator searches for some threshold of connected cliques, such as 70% connected cliques, and then groups into clusters.

Thus, a taxonomy generator categorizes the cliques as a first level, then for every next level, might perform the following steps for every next level. For every element of the current level, find the cliques corresponding to the element and merge them into a common cluster for all elements. Then, categorize all elements to the granularity of L levels in the categorization directory. Then, find the most frequent top-level category and show only elements categorized under this category or the original theme.

While the invention has been described with respect to specific embodiments, one skilled in the art will recognize that numerous modifications are possible. In some embodiments, queries may be processed as they are received so that concept network data for one or more concept networks is updated substantially in real time. The automated systems and methods described herein may be augmented or supplemented with human review of all or part of the resulting unit dictionary, including the units, relationships, taxonomies and the like.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Thus, although the invention has been described with respect to specific embodiments, it will be appreciated that the invention is intended to cover all modifications and equivalents within the scope of the following claims.

What is claimed is:

1. A computer-implemented method for generating at least one taxonomy automatically from data about queries in a querying system, the method comprising:

generating, from query logs representing previous queries, a concept network identifying unit concepts represented in the queries, wherein the concept network reflects tangentially related topics determined by considering frequency of appearance of terms in the query logs and frequency of appearance of terms together in queries;

generating a particular taxonomy by organizing the concept network hierarchically with a parent node and two or more immediate child nodes of the parent node;

wherein generating the particular taxonomy comprises: (a) attempting to categorize a particular previous query in a first taxonomy, (b) determining that the particular previous query cannot be categorized in the first taxonomy, (c) categorizing the particular previous query in a first category of a second taxonomy that differs from the first taxonomy, (d) determining that a mapping from the first category in the second taxonomy to a second category in the first taxonomy exists, and (e) in response to determining that the mapping exists, categorizing the particular previous query in the second category of the first taxonomy; and providing data that is derived based on the particular taxonomy.

2. The method of claim 1, further comprising providing media content to the client.

3. The method of claim 1, wherein a client-side application executes instructions, communicating with server systems to process and display the data.

4. The method of claim 1, further comprising populating one or more indexes with web site and query data from other indexes and data collection technologies.

5. The method of claim 1, further comprising automatically processing and ranking web content tangentially related to a search query.

6. The method of claim 1, wherein a given unit is assigned to a child node with branches higher up in the particular taxonomy representing broader categories and branches lower in the particular taxonomy representing more specific categories.

7. The method of claim 1, further comprising recording user query activity in the form of the query logs.

8. The method of claim 1, further comprising:
performing a search of a corpus using a current query; and
modifying search results according to a mapping of the current query onto the particular taxonomy.

9. The method of claim 1, wherein one of the first taxonomy and the second taxonomy is a geographically organized taxonomy, and wherein the other one of the first taxonomy and the second taxonomy is not a geographically organized taxonomy.

10. A system executing an application that performs operations comprising:
generating in computer memory, from query logs representing previous queries, a concept network identifying unit concepts represented in the queries, wherein the concept network reflects tangentially related topics determined by considering frequency of appearance of terms in the query logs and frequency of appearance of terms together in queries;
generating in the computer memory a particular taxonomy by organizing the concept network hierarchically with a parent node and two or more immediate child nodes of the parent node;
wherein generating the particular taxonomy comprises: (a) attempting to categorize a particular previous query in a first taxonomy, (b) determining that the particular previous query cannot be categorized in the first taxonomy, (c) categorizing the particular previous query in a first category of a second taxonomy that differs from the first taxonomy, (d) determining that a mapping from the first category in the second taxonomy to a second category in the first taxonomy exists, and (e) in response to determining that the mapping exists, categorizing the particular previous query in the second category of the first taxonomy; and
providing data that is derived based on the particular taxonomy.

11. The system of claim 10, wherein the operations further comprise:
performing a search of a corpus using a current query; and
modifying search results according to a mapping of the current query onto the particular taxonomy.

12. The system of claim 10, wherein one of the first taxonomy and the second taxonomy is a geographically organized taxonomy, and wherein the other one of the first taxonomy and the second taxonomy is not a geographically organized taxonomy.

* * * * *